Nov. 9, 1971  M. MAROSHICK  3,618,419
GAIN CONTROL DEVICE
Filed Sept. 30, 1969  4 Sheets-Sheet 1

INVENTOR
MAX MAROSHICK

Finnegan, Henderson & Farabow
ATTORNEYS

INVENTOR
MAX MAROSHICK

Finnegan, Henderson & Farabow
ATTORNEYS

United States Patent Office 3,618,419
Patented Nov. 9, 1971

3,618,419
GAIN CONTROL DEVICE
Max Maroshick, Glen Mills, Pa., assignor to
The Boeing Company, Seattle, Wash.
Filed Sept. 30, 1969, Ser. No. 862,276
Int. Cl. G05g *11/00;* B64c *13/30*
U.S. Cl. 74—479
17 Claims

ABSTRACT OF THE DISCLOSURE

A gain control device is provided for use in a failure correction control system in which the device receives two mechanical input signals during failure-free operation of the control system, and combines these signals to produce an output. The device includes two independent force transmission means which can comprise a series of pivotally connected levers. Each force transmission means includes an input element that receives a separate input signal which is transmitted to a whiffletree that is mounted for pivotal and translational movement relative to a frame. The whiffletree normally transmits a signal that is proportional to the sum of both input signals through a first force transmission channel which connects an output member and the whiffletree. If a jam failure occurs in one of the input signals, shift means are provided to connect the whiffletree and the output member through a normally disengaged second channel that increases the gain of the unfailed signal and transmits the resulting full authority signal to the output member. Output adjusting means are provided for varying the relative locations of the output member and the whiffletree and hence for varying the location of the range of movement of the output member to insure that a proper range of output is available after the failure. The device also includes disconnect failure accommodation means which releasably engage the whiffletree to prevent pivotal movement of the whiffletree after a disconnect failure has occurred and to thus cause the output member to move through its full range of movement.

FIELD OF THE INVENTION

This invention relates to a gain control device for use in a failure correction control system, and more particularly to a device which receives two mechanical input signals during normal operation of the control system and combines these input signals to produce an output signal.

BACKGROUND OF THE INVENTION

The ever-increasing demand for reliability in controls for dirigible craft such as airplanes, helicopters, spacecraft, ships and the like, has led to a demand for redundant control systems, that is control systems containing (a) two or more channels for transmission of a plurality of input signals, and (b) switching means for selectively transmitting an output signal that is proportional to one or more of the input signals.

While the gain control device of the present invention can be used in a number of mechanical control systems where redundancy is desired, it is particularly useful in control systems that incorporate two active independent input signals. Upon failure of one of the input signals, the other input signal remains available for continued control of the output system.

The new grain control device can, for instance, be incorporated in an aircraft control system in which a pilot's control stick activates two independent linkages which form the inputs to the device. The output from the device then comprises movement of an output control linkage. The invention assures a continuing full range of output in the event either one of the input control linkages fails.

Two types of failure are possible in a linkage system for transmitting a mechanical input signal—disconnect failures and jam failures.

A typical disconnect failure occurs when one mechanical element in a linkage becomes operationally disengaged. The mechanical elements in the failed linkage are generally free to move and do not adversely retard the movement of elements of mechanical gain control device to which the linkage is attached. However, the disconnected linkage does not permit the transmission of an effective mechanical signal to the gain control device.

A typical jam failure occurs when two adjacent parts of a mechanical linkage seize, thus locking the entire linkage in a certain position. A jam failure, besides terminating the transmission of an input signal, can have a further effect on the performance of the gain control device, since the input elements of the device may also be frozen or locked in position by the jam failure in the input linkage.

SUMMARY OF THE INVENTION

It is a primary object of this invention to provide a new and improved gain control device for use in a failure correction control system in which the device receives two active mechanical input signals during normal operation of the control system and combines these signals to form an output.

Another object of this invention is to provide a gain control device for receiving and integrating two input signals, which upon the failure of one input signal and the resultant partial loss of authority of the remaining active signal, possesses the capability of increasing the authority of the remaining active signal.

Yet another object of this invention is to provide a gain control device that can act to restore an output member to full authority after a failure of one of a plurality of input signals, even if the identity of the failed input signal has not been ascertained.

A further object of the invention is to provide a gain control device which possesses the capability of operation at reduced authority after a jam failure in one of the input signals.

A still further object of the invention is to provide a rugged and reliable gain control device.

Additional objects and advantages of the invention will be set forth in part in the description which follows, and in part will be obvious from the description, or may be learned by practice of the invention.

Broadly, the invention provides a gain control device for use in a failure correction control system in which the device receives two mechanical input signals during normal operation of the control system and combines these input signals to produce an output signal. The device comprises a frame; an output member mounted for a range of movement relative to the frame; a whiffletree mounted on the frame to permit rotational movement of the whiffletree relative to its axis and translational movement of its axis relative to the frame; first force transmission means for receiving one of the input signals and transmitting the signal to one end of the whiffletree, the force transmission means including an input element mounted for movement relative to the frame in response to one of the input signals; and second force transmission means connected to the other end of the whiffletree for receiving the other input signal and for transmitting this signal to the whiffletree, the second force transmission means including an input element mounted for movement relative to the frame in response to the other signal.

The invention also includes a first force transmission channel normally connecting the output member and the whiffletree for driving the output member through its desired range of movement in response to two active input signals; a second force transmission channel extending from the whiffletree to the output member, the second channel being normally disengaged, for driving the output member through its desired range of movement in response to only one active input signal when the second channel is engaged; and shift means connected to the first and the second force transmission channels for causing the disengagement of the first channel and the engagement of the second channel after a failure has occurred in one of the input signals.

Preferably, disconnect failure accommodation means are provided for moving the output member through its full range of travel without interruption even after a disconnect failure occurs in the linkage supplying one of the signals. In preferred embodiments, the device includes output location adjusting means mounted on the whiffletree for varying the location of the range of movement of said output member relative to said frame.

In its broadest form, the invention provides a device that combines two input signals to transmit an output signal and is capable of transmitting an output signal of one-half authority even after a jam failure in one of the linkages supplying input signal. This form of the invention includes a frame; an output member mounted on the frame; a whiffletree mounted to permit rotational movement of the whiffletree relative to its axis and movement of its axis relative to the frame; a first force transmission means for receiving one of the input signals and transmitting the signal to one end of the whiffletree, the force transmission means including an input element mounted for movement relative to the frame in response to one of the input signals; a second force transmission means connected to the other end of the whiffletree for receiving the other input signal and for transmitting this signal to the whiffletree, the second force transmission means including an input element mounted for movement relative to the frame in response to the other signal; and a first force transmission channel normally connecting the output member and the whiffletree for driving the output member through its desired range of movement in response to two active input signals, and for driving the output member through a reduced range of movement in response to one signal after the other signal has become inactive due to a jam failure.

DETAILED DESCRIPTION OF THE INVENTION

It is to be understood that both the foregoing general description and the following detailed description are exemplary and explanatory, but are not restrictive of the invention. Reference will now be made in detail to the present preferred embodiment of the invention, an example of which is illustrated in the accompanying drawings.

Figure 1:
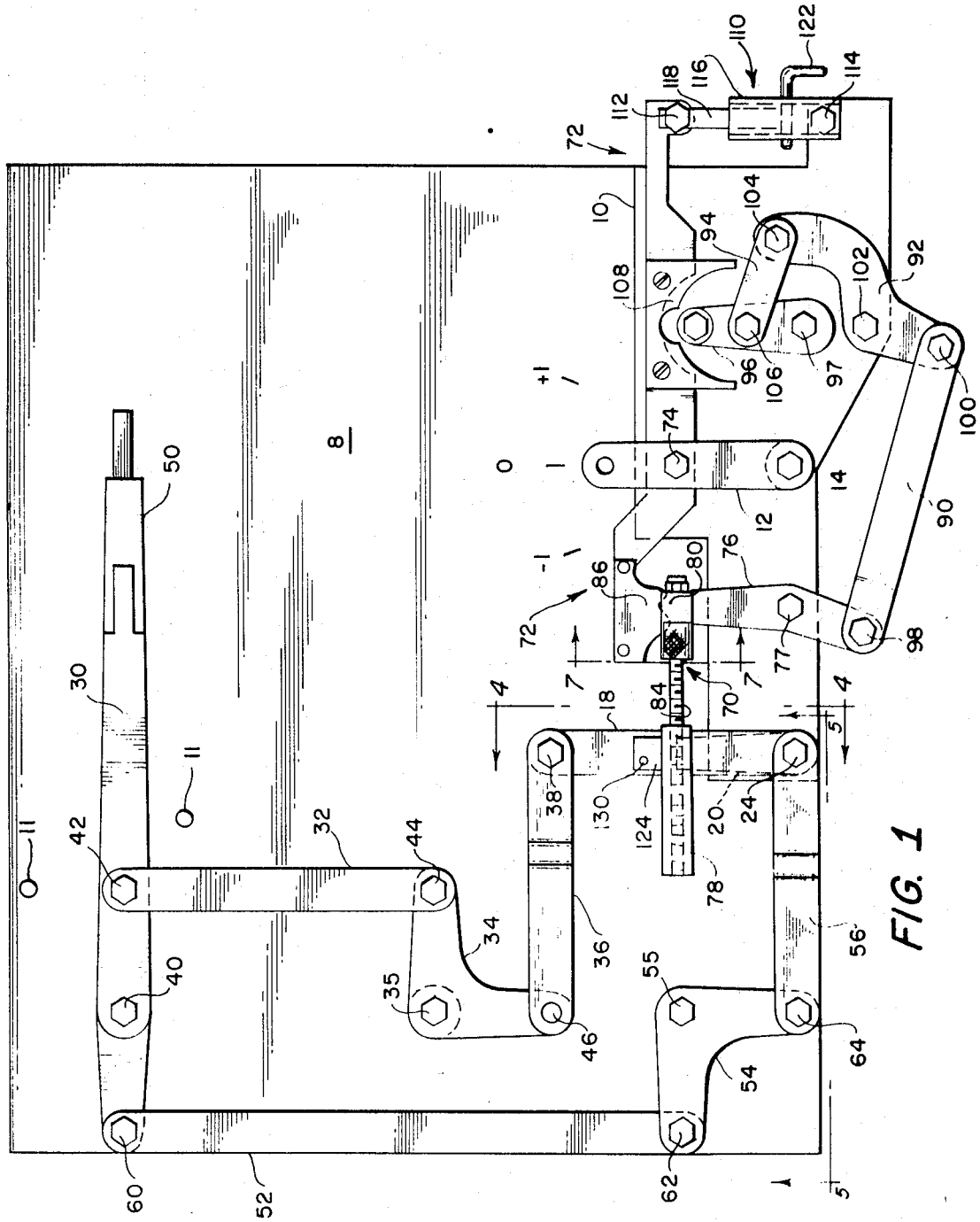
FIG. 1 is a plan view of a gain control device constructed in accordance with the invention with the first force transmission channel engaged and the device receiving two active input signals.
Figure 2:
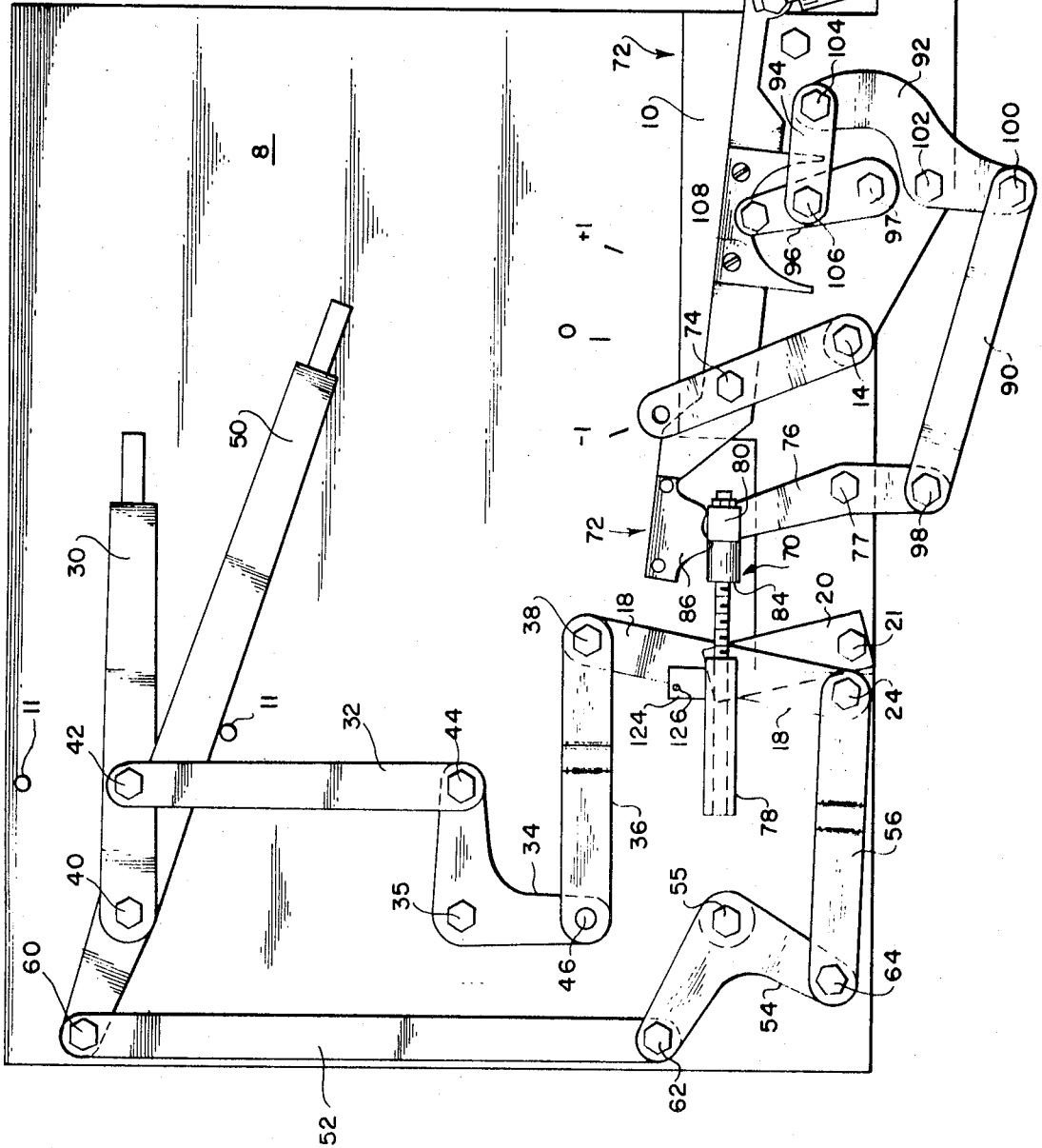
FIG. 2 is a plan view similar to FIG. 1, but illustrating one position of the elements of the device after a jam failure has occurred in the signal to one input element, and the disengagement of the first force transmission channel and the engagement of the second force transmission channel.
Figure 3:
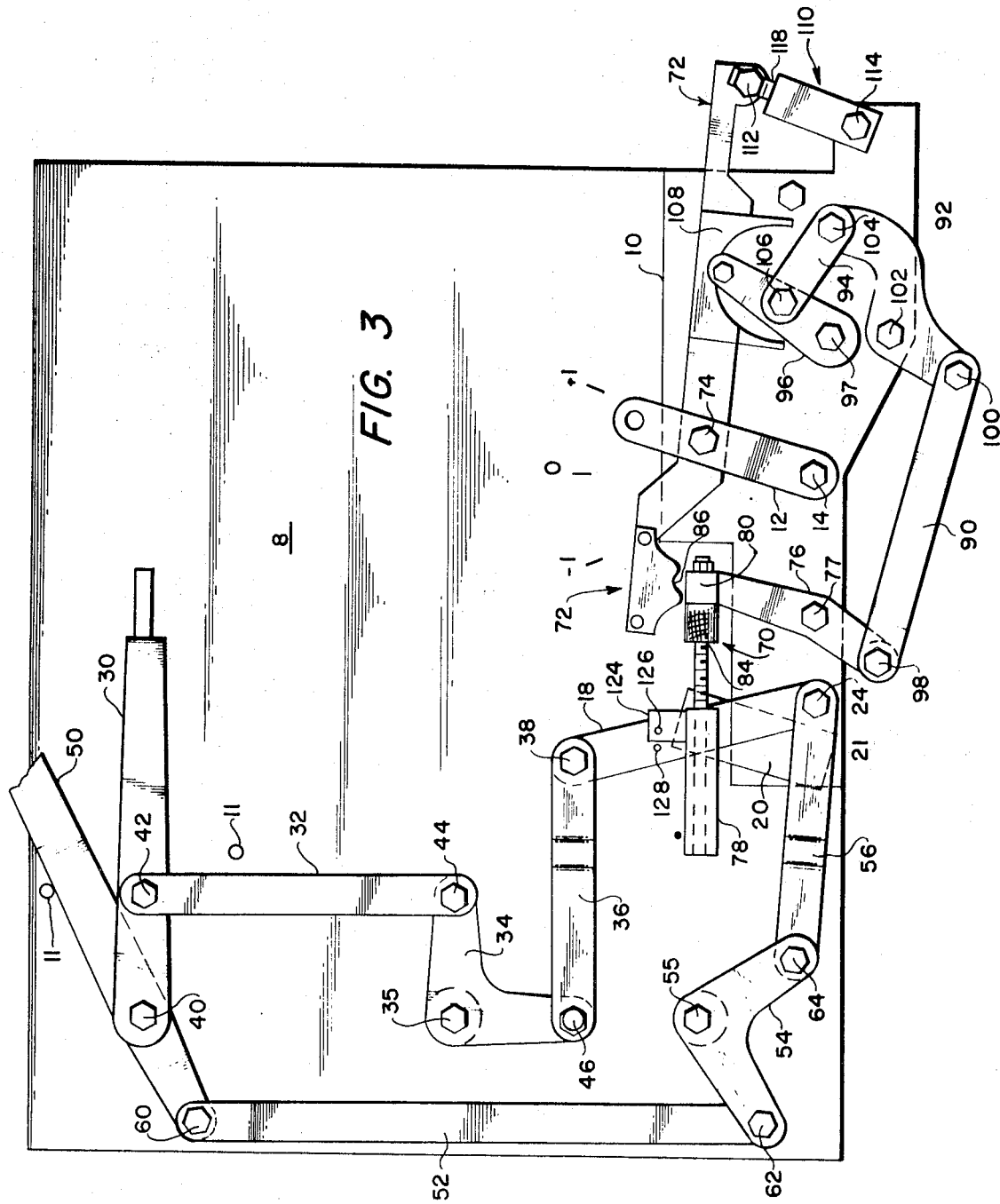
FIG. 3 is a plan view similar to FIG. 2 but illustrating the position of the elements of the device when receiving an input signal of different magnitude than is being received by the device of FIG. 2.

In FIGS. 1-3, a gain control device is illustrated mounted on a frame comprising a base plate 8 and a pedestal 10. A pair of stops 11 are rigidly attached to the frame to limit movement of a pair of input elements in response to input signals, as described below.

In accordance with the invention, an output member is mounted on the frame to permit a range of movement of the output member. As here embodied, an output member 12 is pivotally mounted on the frame by a pivot pin 14. The free end of output member 12 can move in an arcuate path with respect to the frame from a position corresponding to the mark "−1" to the mark "+1."

Figure 4:
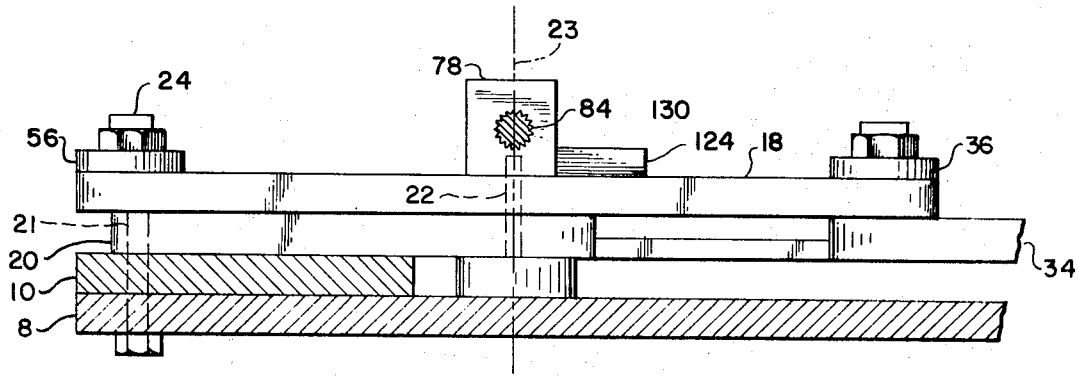
FIG. 4 is a vertical section taken along line 4—4 of FIG. 1.
Figure 5:
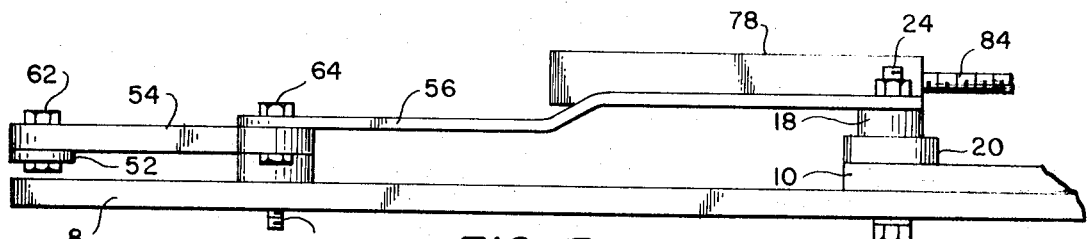
FIG. 5 is an elevation taken along line 5—5 of FIG. 1.

In accordance with the invention, a whiffletree is provided that is mounted to permit rotational movement of the whiffletree about its axis and movement of the axis relative to the frame. As used in the specification and claims, the term whiffletree refers to a swinging bar that is mounted for rotation relative to a frame about an axis located adjacent the longitudinal midpoint of the swinging bar. As here embodied, and as illustrated in FIG. 4, a whiffletree 18 is pivotally mounted on one end of a whiffletree mounting arm 20 which functions as an idler arm by a pivot pin 22 having an axis 23 and the other end of arm 20 is pivotally mounted on the frame by a pivot pin 21. Thus, the axis 23 of whiffletree 18 can move, with respect to the frame, in an arc around the axis of pin 21.

A pair of force transmission means are provided with each such means receiving one of the input signals and transmitting the signal to the whiffletree. These means are arranged so that when the input signals are equal in magnitude and in phase, they produce equal turning forces on the whiffletree which moves relative to the frame in response to variations in the input signals, and does not merely pivot about its axis.

As here embodied, the first force transmission means includes an input element 30, a link 32, a crank 34 which pivots about a pin 35 attached to plate 8, and a terminal link 36 that is pivotally connected to whiffletree 18 by a pivot pin 38. Input element 30 is pivotally mounted on plate 8 by a pivot pin 40 and is connected to link 32 by a pivot pin 42. Link 32 in turn is connected to one arm of crank 34 by a pivot pin 44, and the other arm of crank 34 is connected to terminal link 36 by a pivot pin 46.

The second force transmission means includes an input element 50 that pivots about pin 40 in response to changes in the input signal it receives. The force exerted by the input signal on element 50 is transmitted through a link 52, a crank 54 that is mounted on plate 8 by a pivot pin 55 and a terminal link 56 that is connected to whiffletree 18 by a pivot pin 24.

A pivot pin 60 connects input element 50 and link 52, a pivot pin 62 connects link 52 and one arm of crank 54, and a pivot pin 64 connects the other arm of crank 54 and terminal link 56.

In accordance with the invention, a first force transmission channel is provided that connects the whiffletree and the output member for driving the output member through its desired range of movement during normal operation when the gain control device is receiving two active input signals. As here embodied the first force transmission channel includes a projecting link generally 70, a crank 76, and a walking beam generally 72 that normally engages crank 76 and is pivotally attached to output member 12 by a pivot pin 74.

In the embodiment illustrated in the drawings, projecting link 70 functions as an element of the first and second force transmission channels, and also as an element in disconnect failure accommodation means and output-location-adjusting means which will be described below. As an element of the force transmission channels, link 70 functions merely as a rigid force transmitting element that transfers force from whiffletree 18 to a crank 76 that is pivotably connected to plate 8 by a pivot pin 77.

Figure 7:
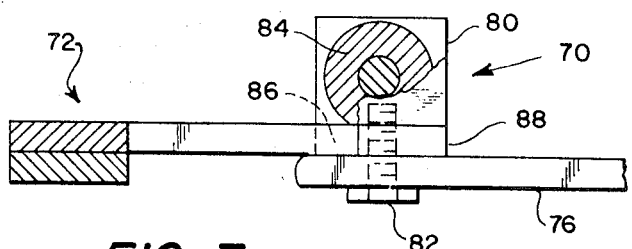
FIG. 7 is a vertical section taken along line 7—7 of FIG. 1.

Link 70 includes a first rectangular solid member 78 that is mounted on pivot pin 22 as seen in FIG. 4 to permit member 78 to pivot with respect to whiffletree 18 and also move with whiffletree 18 with respect to the frame. As seen in FIG. 7, a second rectangular solid member 80 is mounted on a pivot pin 82 that is carried by crank 76. A thumbscrew 84 connects members 78 and 80 with the male threaded portion of thumbscrew 84 engaging a female threaded shaft in member 78. Thus, one end of link 70 (member 78) can pivot about pin 22 on whiffletree 18. The other end of link 70 (member 80) is pivotally mounted on crank 76 by pivot pin 82.

Walking beam 72 includes a follower portion 86, best illustrated in FIGS. 3 and 7, that includes a caging surface which engages a spacing washer 88 that is mounted on pivot pin 82 during normal operation of the gain control device as illustrated in FIG. 1. Follower portion 86 is thus driven by movement of crank 76 and causes walking beam 72 to follow movement of crank 76, while two active input signals are being received. In turn, walking beam 72 drives output element 12 through its normal range of movement.

In accordance with the invention a second force transmission channel extends from the whiffletree to the output member. The second force transmission channel is disengaged as illustrated in FIG. 1 during normal operation, but can be engaged, as illustrated in FIGS. 2 and 3, after a failure in one input signal to increase the gain of the remaining active input signal.

As here embodied, the second force transmission channel includes projecting link 70, pin 82, and crank 76 which are elements that also form part of the first force transmission channel. The second channel also includes lever means such as a link 90, a crank 92, a link 94, and a lever arm 96, and also walking beam 72.

One end of link 90 is pivotally connected to crank 76 by a pivovt pin 98 and the other end is pivotally connected to crank 92 by a pivot pin 100. Crank 92 is pivotally connected to pedestal 10 by a pivot pin 102 and can transmit force to link 94 through a pivot pin 104. Link 94 can transmit force through a pivot pin 106 to lever arm 96 that is mounted on a pivot pin 97 attached to pedestal 10. Lever arm 96 in turn engages a follower plate 108 attached on walking beam 72 when the second channel is engaged as illustrated in FIGS. 2 and 3. Thus, movement of whiffletree 18 can be translated to movement of output member 12 through the second force transmission channel.

With reference to FIGS. 2 and 3, it can be seen that the output of the second force transmission channel is doubled by the action of link 94 and lever arm 96. These elements double the output effect of movement of pivot pin 104. Movement of pivot pin 104 corresponds to movement of pin 82 on crank 76 since pin 82 and pin 104 are connected by a basically symmetrical linkage.

Additional reliability features result from the structural details of the embodiment shown in FIGS. 1-3. For example, the central location of the caging surface on follower plate 108 prevents a sudden unintended doubling of the gain should the second force transmission channel unintentionally engage the walking beam. Because the caging surface is centrally located, the second transmission channel will engage only when output member 12 is in the neutral position.

It should also be noted that the shape of follower portion 86 and its path of travel prevents unintentional disengagement of the second force transmission channel due to disengagement of follower plate 108 from lever arm 96.

In accordance with the invention shift means are connected to each of the first and second force transmission channels for causing the disengagement of the first channel and the engagement of the second channel after a failure occurs in one of the input signals. As here embodied, and as illustrated in FIG. 1, the shift means comprises a spring-loaded actuator generally 110 connected by a pivot pin 112 to walking beam 72 and by a pivot pin 114 to pedestal 10.

Figure 6:
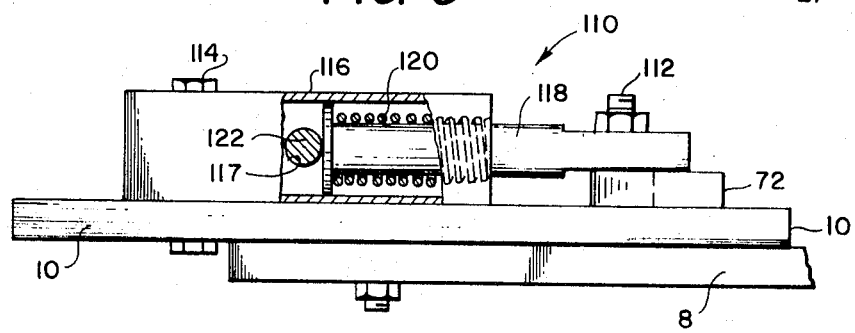
FIG. 6 is a partly sectioned view of the shift means of FIG. 1.

With reference to FIG. 6, the actuator includes a hollow member 116 having a pair of aligned openings 117, a rod 118 projecting into the hollow member, and a biasing means such as spring 120 which is in compression and tends to urge rod 118 to the left as illustrated in FIG. 6.

A pin 122, as illustrated in FIGS. 1 and 6 is inserted through openings 117 in hollow member 116 to hold rod 118 and walking beam 72 in a position in which the first channel is engaged as illustrated in FIG. 1. When pin 122 is removed, spring 120 forces rod 118 and the end of walking beam 72 downwardly as viewed in FIG. 1 and causes the engagement of follower plate 108 and lever arm 96 and the disengagement of follower portion 86 from crank 76.

In preferred embodiments, disconnect failure accommodation means are provided for moving the output member through its full range of travel even after a disconnect failure occurs in one of the input signals. The disconnect failure accommodation means includes structural means that are connected to the frame to permit movement of the structural means along with the whiffletree relative to the frame. A releasable member interconnects the structural means and a point on the whiffletree that is spaced from the axis of the whiffletree to prevent the whiffletree from pivoting about its axis after a disconnect failure. The releasable member permits disengagement of the structural means and the whiffletree after a jam failure.

As here embodied, the structural means of the disconnect failure accommodation means includes link 70, a projecting member 124 attached to link 70, and having an opening 126 extending towards whiffletree 18. Link 70 and whiffletree 18 possess the same capability for motion relative to the frame since arm 70 is mounted on whiffletree 18. An opening 128 is provided in whiffletree 18, that is best illustrated in FIG. 3, and a shear pin 130 extends through openings 126 and 128 and connects member 124 and whiffletree 18.

During normal operation when the gain control device is receiving two equal active input signals, each of terminal arms 36 and 56 transmits a portion of the force necessary to move the output member through its full range of travel. During this normal operation, equal input signals acting through the respective lever arms of each force transmission means keep terminal links 36 and 56 aligned substantially in parallel and substantially perpendicular to whiffletree 18.

If a disconnect failure occurs in the linkage supplying a signal to the first force transmission means, or in the first force transmission means itself, only input element 50 continues to receive an active input signal. Terminal link 36 can still be pivoted about pins 46 and 38, but no output force is received at pin 38 from the first force transmission means.

With reference to FIG. 1, the active signal to the second force transmission means is transmitted to terminal link 56 and can move pivot pin 24 through its full normal range of movement. However, an increase in the active input signal to the second force transmission means in the absence of a corresponding input signal to the first force transmission means, exerts a turning force that would tend to cause whiffletree 18 to pivot in a counter clockwise direction about the axis of pin 38. Terminal link 56 is thus capable of only moving link 70 and output member 12 through one half of their normal range of movement in the absence of the disconnect failure accommodation means since link 70 is mounted at the midpoint of whiffletree 18. However, after a disconnect failure, shear pin 130 and projecting member 124 resist the torque applied by terminal link 56 to whiffletree 18 and prevent pivotal movement of whiffletree 18 about either pin 22 or pin 38 and keep terminal links 36 and 56 aligned generally in parallel and positioned transversely of whiffletree 18. Thus, when pivot pin 24 moves through its full range of travel, whiffletree 18, link 70, and output member 12 will move through their full range of travel and an input signal to only the second force transmission means will move the output member through its full range of travel.

In a similar fashion, the disconnect failure accommodation means permits an input signal to the first force transmission means to move output member 12 through its full range of travel, when there is a disconnect failure in the linkage providing a signal to the second force transmission means or even a disconnect failure in the linkage of the second force transmission means itself.

The disconnect failure accommodation means comes into operation instantaneously after a disconnect failure and can counteract a disconnect failure in either of the input signals, or either of the force transmission means. It should be noted that the disconnect failure can be offset without requiring a movement of parts.

Preferably, the gain control device includes an output-location-adjusting means for varying the location of the range of movement of the output member. After a jam failure has occurred, this means permits adjusting the range of movement of the output member to coincide with the original range of movement irregardless of the position in which one end of the whiffletree is frozen. The output-location-adjusting means includes a first member pivotally connected to the whiffletree, a second member that is pivotally connected to the output member, and spacer means connecting said first and second members for fixing them various distances apart. A change in the dimension of the output-location-adjusting means thus tends to move the output member in relation to the whiffletree, and after a jam failure, moves the output member in relation to the frame.

As here embodied, the output-location-adjusting means comprises projecting link generally 70 having a rectangular solid member 78 at one end that is pivotally mounted on whiffletree 18 at axis 23 of the whiffletree. If a jam failure in an input signal has occurred, one of the terminal links 36 or 56 that connect whiffletree 18 to the input signals will be frozen in position. The frozen terminal link coupled with the still active input signal will restrict translational movement of the axis 23 of whiffletree 18 in response to the output-location-adjusting means.

The member forming the other end of link 70, member 80 as described above, is pivotally attached to pivot pin 82 on crank 76 and is thus always connected to output member 12 by either the first or the second force transmission channel. A spacer means comprising a thumbscrew 84 connects members 78 and 80.

With reference to FIGS. 2 and 3, it can be seen that if the distance between axis 23 and the axis of pivot pin 82 is increased by rotating thumbscrew 84 as viewed in FIG. 7 in a clockwise manner, then walking beam 72 and the free end of output member 12 will be moved to the right in relation to the frame.

In a similar fashion, if thumbscrew 84 is rotated in a counter-clockwise direction as viewed in FIG. 7, link 70 is shortened and walking beam 72 and the free end of output member 12 will be moved to the left.

The operation of both the disconnect failure accommodation means and the operation of the shift means when a jam failure occurs will now be described for the situation where a jam failure occurs in the linkage supplying a signal to the first force transmission means, or in the first force transmission means itself.

The elements of the first force transmission means are frozen in position by the jam failure while the elements of the second force transmission means are able to freely move in response to the input signal received by input element 50 as can be seen by viewing FIGS. 2 and 3 which illustrate two positions assumed by the second force transmission means after a jam failure in the first force transmission means.

One effect of a jam failure on the first force transmission means is shearing of shear pin 130, since the position of pin 38 becomes fixed and pin 24 and whiffletree 18 rotate about pin 38. Motion of terminal link 56 and pin 24 in response to variations in the input signal to the second force transmission means will pivot whiffletree 18 about pin 38 and thus tend to misalign opening 126 in projecting member 124 and opening 128 in whiffletree 18 as best seen in FIG. 3 and will cause pin 130 to shear.

Since whiffletree 18 can, after pin 130 has sheared, pivot freely about pin 38 and since projecting link 70 which forms part of the first and second force transmission channels is connected at the midpoint of whiffletree 18, output member 12 is only carried through half of its normal range of movement by the normal movement of pin 24. The output from the gain control device is reduced to one half normal gain by the jam failure and the subsequent disengagement of the disconnect failure accommodation means. The shift means as described above can be used to restore full gain to output member 12. However, it should be noted that the operator of the device can elect to continue to operate the device at half its normal output.

First, with reference to FIG. 1, pin 122 is removed from hollow member 116 to permit spring 120 to force rod 118 down into the hollow member and pivot walking beam 72 in a clockwise direction with relation to FIG. 1 so that follower plate 108 engages lever arm 96 of the second force transmission channel and follower portion 86 is disengaged from crank 76, to disengage the first force transmission channel as best seen in FIGS. 2 and 3. The second force transmission channel doubles the range of movement of output member 12 in response to a single input signal as compared to the range of movement a single signal acting through the first force transmission channel imparts to output member 12.

While this invention has been described in a simplified environment for ease in understanding, it will be apparent to those skilled in the art that in most practical applications of the grain control device in failure correction systems, it will be desirable to incorporate into the system automatically controlled devices, such as a hydraulic or electrical actuator, for actuating the shift means when a failure is sensed, and a linear actuator for varying the effective length of the spacer means.

A jam failure sensing device is not essential, although one can be included, since a pilot or other operator can usually sense a loss of one half of the output authority after a jam failure, and the knowledge of which input signal has failed is not critical to the action to be taken to restore full output.

In summary, the invention provides a gain control device that includes a pair of force transmission means which each have an input element that receives a separate input signal and transmits this signal to a whiffletree. When two active signals are being received, the whiffletree transmits a force to an output member that is proportional to the sum of the two input signals through the first force transmission channel. Shift means and a second force transmission channel which increases the gain of a single input signal are provided to restore the output signal to full authority after a jam failure in a linkage supplying one signal to the whiffletree.

The present invention permits restoring the output signal to full authority without requiring intelligence as to which input signal has suffered a jam failure. Advantageously, the gain control device will operate at one-half authority after a jam failure until the shift means are actuated.

The invention in its broader aspects is not limited to the specific details shown and described and departures may be made from such details within the spirit and scope of the accompanying claims without departing from the principles of the invention and without sacrificing its chief advantages.

What is claimed is:

1. A gain control device for use in a failure correction control system in which the device receives two mechanical input signals during normal operation of the control system and combines these input signals to produce an output signal, the device comprising:
   (a) a frame;
   (b) an output member mounted on said frame for a range of movement relative to said frame;
   (c) a whiffletree mounted to permit rotational movement of the whiffletree relative to its axis and movement of its axis relative to said frame;
   (d) a first force transmission means for receiving one of the input signals and transmitting the signal to one end of said whiffletree, said force transmission means including an input element mounted for movement relative to said frame in response to one of the input signals;
   (e) a second force transmission means connected to the other end of said whiffletree for receiving the other input signal and for transmitting this signal to said whiffletree, said second force transmission means including an input element mounted for movement relative to said frame in response to the other signal;
   (f) a first force transmission channel normally connecting said output member and said whiffletree for driving said output member through its desired range of movement in response to two active input signals;
   (g) a second force transmission channel extending from said whiffletree to said output member, said second channel being normally disengaged, for driving said output member through its full desired range of movement in response to only one input signal when said second channel is engaged; and
   (h) shift means connected to said first and said second force transmission channels for causing the disengagement of said first channel and the engagement of said second channel after a failure has occurred in one of the input signals.

2. The invention of claim 1, including disconnect failure accommodation means for moving said output member through its full range of travel even after a disconnect failure occurs in the linkage supplying one of the signals, said disconnect failure accommodation means including structural means mounted for movement along with said whiffletree in relation to said frame, and releasable means connecting said structural means and said whiffletree at a point spaced from the axis of rotation of said whiffletree for resisting turning forces exerted by the remaining active channel so that said whiffletree will move with respect to said frame rather than merely pivot about its axis after a disconnect failure occurs in one of said channels, said releasable means allowing the disengagement of said structural means and the point on said whiffletree to permit said whiffletree to pivot about its axis if a jam failure occurs in either of the linkages supplying an input signal to the device.

3. The invention of claim 2 in which said releasable means includes a shear pin which will shear after a jam failure to permit release of said disconnect failure accommodation means.

4. The invention of claim 1 in which each of said first and said second channels terminate in a walking beam that is pivotally attached to said output member.

5. The invention of claim 1 including output-location-adjusting means that comprise a first member pivotally mounted on said whiffletree, a second member attached to said second channel, and spacer means connecting said first and second members for fixing said first and second members various distances apart.

6. A gain control device for use in a failure correction control system in which the device receives two mechanical input signals during normal operation of the control system and combines these input signals to produce an output signal, the device comprising:
   (a) a frame;
   (b) an output member mounted on said frame for a range of pivotal movement relative to said frame;
   (c) a whiffletree mounted on said frame to permit rotational movement of the whiffletree about its axis and movement of the axis of said whiffletree relative to said frame;
   (d) a first force transmission means for receiving one of the input signals and transmitting the signal to one end of said whiffletree, said force transmission means including an input element mounted on said frame for movement relative to said frame in response to one of the input signals;
   (e) second force transmission means connected to the other end of said whiffletree for receiving the other input signal and for transmitting this signal to said whiffletree, said second force transmission means including an input element mounted on said frame for movement relative to said frame in response to the other signal;
   (f) output location adjusting means connecting said whiffletree and said output member for varying the location of the range of movement of said output member relative to said frame;
   (g) a first force transmission channel normally connecting said output member and said whiffletree for driving said output member through its desired range of movement in response to two active input signals;
   (h) a second force transmission channel extending from said whiffletree to said output member, said second channel being normally disengaged, for driving said output member through its desired range of movement in response to only one input signal when said second channel is engaged; and
   (i) shift means connected to said first and second force transmission channels for causing the disengagement of said first channel and the engagement of said second channel after a failure has occurred in one of the input signals.

7. The invention of claim 6 in which said output-location-adjusting means comprises a first member pivotally mounted on said whiffletree, a second member attached to said second channel, and spacer means connecting said first and second members for fixing said first and second members various distances apart, and said adjusting means also forms part of each of said first and second force transmission channels so that a change in the distance between said first and second members changes the location of said output member.

8. The invention of claim 7 including a whiffletree mounting arm having one end pivotally mounted on said frame and the other end pivotally mounted on the axis of said whiffletree to permit said whiffletree to move in an arcuate path with respect to said frame and also pivotally with respect to said frame.

9. The invention of claim 7 in which said first channel includes a walking beam which engages one end of a crank driven by said second member of said output-location-adjusting means and said walking beam is pivotally attached to said output member, and said second channel includes lever means pivotally connected to the other end of said crank, said lever means being capable of engaging said walking beam to move said output member through its full range of movement after a failure has occurred in one of the input signals.

10. The invention of claim 9 in which said shift means comprises a base member pivotally mounted on said frame, a rod pivotally connected to said walking beam and biasing means connecting said rod and said frame for varying the length of said shift means.

11. The invention of claim 7 including disconnect failure accommodation means for moving said output member through its full range of travel even after a disconnect failure occurs in the linkage supplying one of the signals, said failure accommodation means including an arm extending from said first member, and releasable means connecting said arm and said whiffletree at a point spaced from the axis of rotation of said whiffletree to resist turning forces exerted by the remaining active channel so that the axis of said whiffletree will move with respect to said frame after a disconnect failure occurs in one of said channels, said releasable means disengaging said arm and the point on said whiffletree if a jam failure occurs in either of the linkages that supply an input signal to the device to permit said whiffletree to pivot about its axis.

12. The invention of claim 9 in which said lever means includes a second crank; a link connecting said second crank to the other end of said crank, a lever arm having one end pivotally connected to said frame, a link driven by said second crank and connecting said second crank and the midpoint of said lever arm, to double the length of the path of movement of said lever arm with respect to the length of the path of travel of said one end of said crank.

13. The invention of claim 12 in which said walking beam includes a follower portion that engages said crank and a follower plate that engages said lever arm, and said follower portion prevents disengagement of said follower plate and said lever arm by limiting movement of said crank when said second force transmission channel is engaged.

14. A device for transmitting a reduced authority signal after a jam failure, for use in a failure correction control system in which the device receives two mechanical input signals during normal operation of the control system and combines these input signals to produce an output signal, the device comprising:
  (a) a frame;
  (b) an output member mounted on said frame for a range of movement relative to said frame;
  (c) a whiffletree mounted to permit rotational movement of the whiffletree relative to an axis located adjacent its longitudinal midpoint and movement of its axis relative to said frame;
  (d) a first force transmission means for receiving one of the input signals and transmitting the signal to one end of said whiffletree, said force transmission means including an input element mounted for movement relative to said frame in response to one of the input signals;
  (e) a second force transmission means connected to the other end of said whiffletree for receiving the other input signal and for transmitting this signal to said whiffletree, said second force transmission means including an input element mounted for movement relative to said frame in response to the other signal; and
  (f) a first force transmission channel normally connecting said output member and said whiffletree for driving said output member through its desired range of movement in response to two active input signals, and for driving said output member through a reduced range of movement in response to one signal after the other signal has become inactive due to a jam failure.

15. The gain control device of claim 1 in which the first force transmission channel includes (i) a link having one end pivotally mounted with respect to said whiffletree on the axis of said whiffletree for movement with said whiffletree axis with respect to said frame, and (ii) a crank pivotally connected to the other end of said link, said crank having an output end connected to said output member.

16. The invention of claim 6 in which the first force transmission channel includes (i) a link having one end pivotally mounted with respect to said whiffletree on the axis of said whiffletree for movement with said whiffletree axis with respect to said frame, and (ii) a crank pivotally connected to the other end of said link, said crank having an output end connected to said output member.

17. The invention of claim 14 in which the first force transmission channel includes (i) a link having one end pivotally mounted with respect to said whiffletree on the axis of said whiffletree for movement with said whiffletree axis with respect to said frame, and (ii) a crank pivotally connected to the other end of said link, said crank having an output end connected to said output member.

References Cited

UNITED STATES PATENTS

| | | | |
|---|---|---|---|
| 1,625,563 | 4/1927 | Payne | 74—479 |
| 2,590,716 | 3/1952 | Lisle | 244—85 |
| 3,286,958 | 11/1966 | Moran | 244—84 |
| 3,368,351 | 2/1968 | Wood | 244—84 |

FOREIGN PATENTS

| | | | |
|---|---|---|---|
| 159,240 | 3/1940 | Germany | 244—85 |
| 130,213 | 7/1919 | Great Britain | 244—85 |
| 545,296 | 5/1942 | Great Britain | 244—85 |
| 717,141 | 10/1954 | Great Britain | 244—85 |
| 835,049 | 5/1960 | Great Britain | 74—479 |

WILLIAM F. O'DEA, Primary Examiner

T. R. HAMPSHIRE, Assistant Examiner

U.S. Cl. X.R.

74—480; 244—83